United States Patent
Ge et al.

(10) Patent No.: US 8,228,803 B1
(45) Date of Patent: Jul. 24, 2012

(54) METHOD AND APPARATUS FOR FINDING CRITICAL TRAFFIC MATRICES

(75) Inventors: Zihui Ge, Secaucus, NJ (US); Yin Zhang, Austin, TX (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 1005 days.

(21) Appl. No.: 11/477,437

(22) Filed: Jun. 28, 2006

(51) Int. Cl.
*H04L 1/00* (2006.01)
(52) U.S. Cl. ........................................ 370/238
(58) Field of Classification Search .................. 370/230, 370/232, 336, 238; 340/907
See application file for complete search history.

(56) References Cited

U.S. PATENT DOCUMENTS

| | | | |
|---|---|---|---|
| 5,426,674 A * | 6/1995 | Nemirovsky et al. | 709/241 |
| 7,457,286 B2 * | 11/2008 | Alexander, Jr. | 370/379 |

* cited by examiner

*Primary Examiner* — Chandrahas Patel

(57) ABSTRACT

Method and apparatus for determining at least one critical traffic matrix from a plurality of traffic matrices, where each of the plurality of traffic matrices is organized into at least one of a plurality of clusters, for a network is described. In one embodiment, a merging cost is calculated for each possible pair of clusters within a plurality of clusters. A pair of traffic matrices that is characterized by having the least merging cost is then merged. The calculating and the merging steps are subsequently repeated until a predefined number of clusters remains, wherein the remaining clusters are used to determine at least one critical traffic matrix.

16 Claims, 4 Drawing Sheets

METHOD AND APPARATUS FOR FINDING CRITICAL TRAFFIC MATRICES

BACKGROUND OF THE INVENTION

1. Field of the Invention

Embodiments of the present invention generally relate to Internet Protocol (IP) network engineering applications, such as network survivability analysis, traffic engineering, and capacity planning. More specifically, the present invention relates to a method and apparatus for finding critical traffic matrices.

2. Description of the Related Art

At present, large operational Internet Protocol (IP) networks are typically made up of hundreds of routers, thousands of links, tens of thousands of routes, and may carry over one peta-byte ($=10^{15}$ bytes) of traffic per day. The ability to effectively design, engineer, and manage such large networks is crucial to end-to-end network performance and reliability. Until recently, a major obstacle to developing effective methods for network engineering in operational IP networks has been the inability of network operators to measure traffic matrices. A traffic matrix represents the amount of traffic between an origin and a destination in a given network. Similarly, it is an essential input for a variety of IP network engineering applications, such as capacity planning, traffic engineering, and network survivability analysis. Due to the extreme importance of traffic matrices, there have been tremendous efforts and many recent advances in the area of traffic matrix estimation. These techniques have enabled Internet service providers (ISPs) to accurately measure the traffic matrix of their network in a continuous fashion (in the granularity of minutes to an hour).

However, network operators and engineers are now facing the new challenge of having to deal with hundreds or even thousands of traffic matrices, all from real measurement at different time instances. Ideally, network engineers would like to base their design and analysis on all traffic matrices for a significant period of time (e.g., a couple of months). In practice, however, it is usually inconvenient or infeasible to use a large number of traffic matrices. It is inconvenient since many traffic analysis tasks require human intervention (e.g., examine the scenario where congestion has occurred). Dealing with a large number of traffic matrices is very undesirable. It is infeasible since many traffic engineering applications are very computationally expensive. Unfortunately, the solutions developed so far are often quite ad hoc. One common practice is to generate a "peak-all-elements" traffic matrix that has the peak demand for each origin-destination flow. Another approach is to take the traffic, matrix at the network-wide busiest time (i.e., the traffic matrix with the largest total volume). However, none of them are satisfactory. Namely, the "peak-all-elements" traffic matrix is usually too conservative since it significantly over-estimates the total traffic volume, whereas the busiest-time traffic matrix runs the risk of under-estimating the demands since not all flows peak at the network peak.

Thus, it is highly desirable to be able to find a small number of "critical" traffic matrices.

SUMMARY OF THE INVENTION

In one embodiment, a method and apparatus for determining at least one critical traffic matrix from a plurality of traffic matrices, where each of the plurality of traffic matrices is organized into at least one of a plurality of clusters, for a network is described. Specifically, a merging cost is calculated for each possible pair of clusters within a plurality of clusters. A pair of traffic matrices that is characterized by having the least merging cost is then merged. The calculating and the merging steps are subsequently repeated until a pre-defined number of clusters remains, wherein the remaining clusters are used to determine at least one critical traffic matrix.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
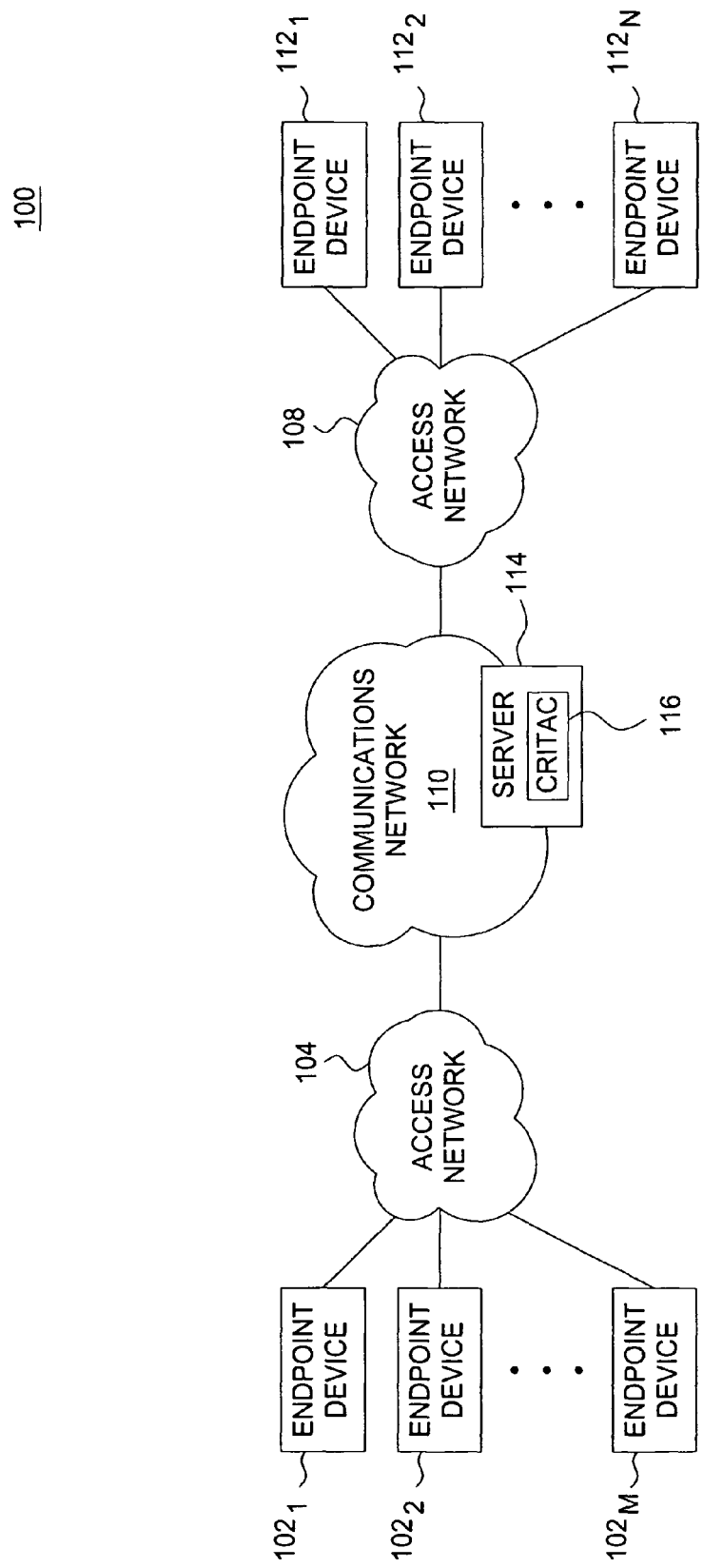
FIG. 1 is a graph depicting an exemplary two dimensional traffic matrices set in accordance with one or more aspects of the invention.

To better understand the present invention, FIG. 1 illustrates communication architecture 100 comprising an example network, e.g., a packet network, related to the present invention. Exemplary packet networks include Internet Protocol (IP) networks, asynchronous transfer mode (ATM) networks, frame-relay networks, and the like. An IP network is broadly defined as a network that uses Internet Protocol to exchange data packets.

In one embodiment, the network may comprise a carrier (a service provider) VoIP core infrastructure over an Internet Protocol/Multi-Protocol Label Switching (IP/MPLS) based core backbone network 110. This type of network is capable of carrying digital content (e.g., voice signals, video signals, etc.) as packetized data over an IP network. The core communications network 110, which is typically operated by a service provider, is connected to a plurality of access networks (e.g., access networks 104, 108). These access networks may comprise any type of communications network such as a public switched telephone network (PSTN), a DSU-cable network, a local area network (LAN), and the like. Although only two access networks are shown in FIG. 1, those skilled in the art realize more access networks may be utilized.

The network also comprises a plurality of endpoint devices. Endpoint devices $102_{1 \ldots m}$ are configured for communication with the core network 110 via the access network 104. Similarly, endpoint devices $112_{1 \ldots n}$ are configured for communication with the core network 110 via the access network 108. The endpoint device may comprise any type of network communication devices such as a personal computer (PC), a server, an IP phone, and the like.

The core communications network 110 further includes a dedicated application server 114. In one embodiment of the present invention, the server 114 is configured to monitor the traffic flow that traverses the communications network 110. In one embodiment, the service provider responsible for the network may employ a server 114 to monitor the amount of VoIP traffic between the access network 104 (e.g., origin) and the access network 108 (e.g., destination). Alternatively, the traffic between two specific endpoint devices (e.g., endpoint devices $102_1$ and $112_1$) may be monitored. In yet another embodiment, the server may reside in an access network (e.g., access network 104) in order to measure the traffic flow that exists between endpoints, or between specific routers, within that network. Regardless of the type of traffic flow data collected, the server 114 may also be configured to generate traffic matrices. A traffic matrix is a multi-dimensional array in which the entries (or elements) numerically represent the traffic flow between a given origin (e.g., an origin node) and destination (e.g., a destination node). In addition, the server 114 is further configured to find critical traffic matrices from the plurality of generated traffic matrices using the present invention. For example, in one embodiment application server 114 may include a Critical-ness Aware Clustering (CritAC) Module 116. A critical traffic matrix is a matrix that is representative of a plurality of traffic matrices.

Network engineers are constantly facing the challenge driven by two conflicting requirements. First, there is a need to design and provision the network in a robust way so that the network is prepared for any worst-case scenarios. On the other hand, constraint due to limited capital expenditure requires the network to operate in the most efficient manner. Therefore, when choosing candidate traffic matrices for network design and analysis, network engineers are often searching for a small set of critical traffic matrices that can be used to represent all worst-case scenarios without excessively inflating the traffic demand. More specifically, there is a need for the ability to extract a small number of such critical traffic matrices from a large collection (i.e., hundreds or thousands) of measured traffic matrices.

In the context of network engineering, worst-case often refers to the situation when some link in the network is congested or heavily loaded. As manifested to network users, congestion often means high packet loss and long link delay on all traffic that traverses through a given link. Thus, it is natural to use link utilization based metrics, e.g., the network-wide maximum link utilization, to measure the level of "unfavorableness" of a traffic matrix. Two properties related to both traffic matrices and link utilization may be used: 1) the monotonic property and 2) the linear property. The monotonic property describes when a traffic matrix $X_1$ has every flow smaller than or equal to the corresponding flow in another traffic matrix $X_2$ (i.e., $X_2$ dominates $X_1$). Specifically, the link utilization for demand $X_1$ should always be smaller than or equal to the link utilization for demand $X_2$ under any routing configuration. The linear property states that if under a routing configuration, the link utilizations are $Y_1$ and $Y_2$ for traffic demand matrices $X_1$ and $X_2$ respectively, then for demand $X_3=aX_1+(1-a)X_2$, the resulting link utilizations should be $Y_3=aY_1+(1-a)Y_2$ under the same routing configuration. Here, a is a scalar between 0 and 1, and $Y_1, Y_2, Y_3$ are vectors with size equal to the number of links in the network. The monotonic and linear properties allow us to focus on critical traffic matrices that can dominate all measurement traffic matrices by linear combination.

Figure 2:
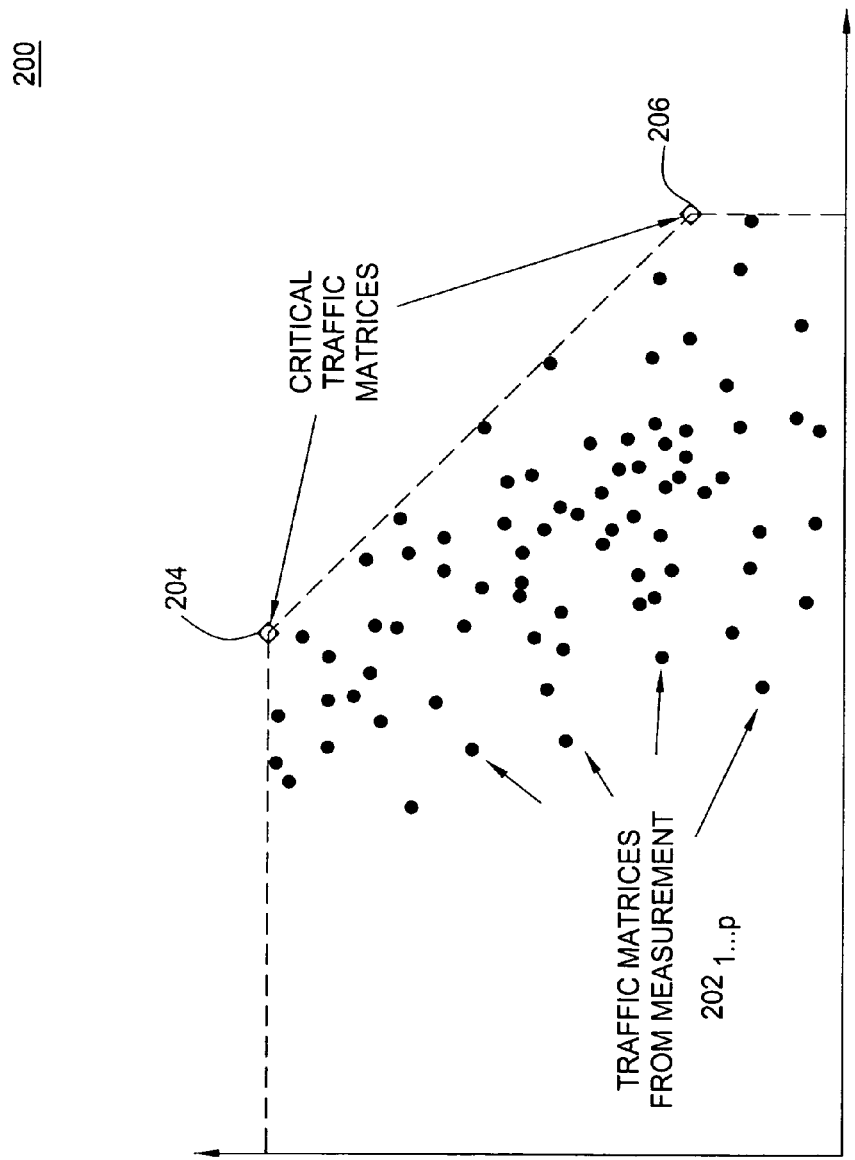
FIG. 2 depicts an exemplary embodiment of pseudocode detailing the Critical-ness Aware Clustering (CritAC) algorithm in accordance with one or more aspects of the invention.

FIG. 2 illustrates a graphical depiction 200 for a two dimensional traffic matrices set. The horizontal and vertical axes represent the traffic volume on each of the two dimensions, respectively. Each dot within FIG. 2 represents one traffic matrix measured at a given time (e.g., in one hour). Collectively, the dots $202_{1...p}$ capture the traffic variability of the network over a long period of time (e.g., a few weeks to several months). The two squares 204, 206 are the two traffic matrices desired in this example. Notably, the two critical traffic matrices dominate all of the other traffic matrices by linear combination and have the least "oversizing" (i.e., inflation of traffic demand from the measure traffic matrices). The concerns for "prepare-for-worst-case" and "minimum-oversizing" by network engineers become the requirements of 1) critical traffic matrices dominating all measurement traffic matrices by linear combination and 2) the convex hull of the critical traffic matrices having small volume (or area in the two-dimensional example). However, since a traffic matrix usually has a large number of dimensions—a network of N nodes has $N^2$ flows in its traffic matrix, computing the volume of the polyhedron formed by the critical traffic matrices is a difficult task by itself. Thus, the solution space is restricted to where all critical traffic matrices are constrained to be close to an original measured traffic matrix. This results in a reasonable practical requirement because for tasks such as capacity planning and weight optimization, it is advantageous to conduct analysis based on traffic matrices that match real traffic patterns or scenarios.

As mentioned above, the primary problem faced by network operators today involves the selection of critical matrices. This problem is called the Critical traffic matrices selection (CritMat) problem. Each traffic matrix is represented as a K-dimensional vector where K is a large number. Given a finite set of traffic matrices $X=\{\vec{x}_1, \vec{x}_2, \ldots, \vec{x}_n\}$ and an integer m, the CritMat problem is to find a set of critical traffic matrices, $Y=\{\vec{y}_1, \vec{y}_2, \ldots, \vec{y}_m\}$ that minimizes distance function $$\max_{\vec{y} \in Y} \|\vec{y}, X\|$$

while subjected to dominance constraint $$\forall \vec{x} \in X, \exists a_1, a_2, \ldots, a_m, \sum_{i=1}^{m} a_i = 1 \text{ and } \vec{x} \leq_d \sum_{i=1}^{m} a_i \vec{y}_i.$$

Here, $\vec{x} \leq_d \vec{y}$, (i.e., $\vec{x}$ being dominated by $\vec{y}$), is true only when $\vec{x}$ is smaller than $\vec{y}$ in all dimensions. The distance function $\|\vec{y}, X\|$ may be defined in a number of ways:

the minimum distance to an input traffic matrix $$\|\vec{y}, X\| = \min_{\vec{x} \in X} |\vec{y} - \vec{x}|_2$$

the maximum difference in each dimension to the closest input traffic matrix $$\|\vec{y}, X\| = \min_{\vec{x} \in X} |\vec{y} - \vec{x}|_\infty$$

the minimum traffic demand oversizing $$\|\vec{y}, X\| = \min_{\vec{x} \in X, \vec{x} \leq_d \vec{y}} |\vec{y} - \vec{x}|_1$$

the minimum weighted traffic demand oversizing $$\|\vec{y}, X\| = \min_{\vec{x} \in X, \vec{x} \leq_d \vec{y}} \vec{w} \cdot (\vec{y} - \vec{x})$$

where w is the geographical distance (e.g., air mile) between flow source and flow destination of each flow.

the minimum link load oversizing where A is a routing matrix.

$$\|\vec{y}, X\| = \min_{\vec{x} \in X, \vec{x} \leq_d \vec{y}} |A(\vec{y} - \vec{x})|_1$$

the minimum oversizing in bandwidth mileage product $$\|\vec{y}, X\| = \min_{\vec{x} \in X, \vec{x} \leq_d \vec{y}} \vec{d} \cdot (A(\vec{y} - \vec{x}))$$

where A is a routing matrix and $\vec{d}$ is the link length (in mileage) of each link.

Note that in the above functions, the notation $|\bullet|_1$, $|\bullet|_2$ and $|\bullet|_\infty$ are the standard $L_1$-norm, $L_2$-norm and $L_\infty$-norm of vector variables respectively. More specifically, $$|(a_1, a_2, \ldots, a_r)|_1 = \sum_{i=1}^{r} a_i$$

$$|(a_1, a_2, \ldots, a_r)|_2 = \sqrt{\sum_{i=1}^{r} a_i^2}$$

$$|(a_1, a_2, \ldots, a_r)|_\infty = \max_{1 \leq i \leq r} a_i$$

In one embodiment of the present invention, certain approximation algorithms for CritMat are utilized. In one embodiment, the present invention may employ one of two techniques, K-means and hierarchical agglomeration. K-means starts with a randomly chosen m vectors as the center of the clusters, where m in is the total number of clusters desired. Each vector computes its distance to each of the m clusters, and joins the one that has the minimum distance. Once a vector has joined a cluster, the center of the cluster is recomputed. This step repeats until no vector can find a smaller distance to another cluster than the one that it belongs to.

Hierarchical agglomeration starts with n clusters centered at each of the n vectors to be clustered. At each iteration, the pair of clusters with the minimum distance to each other is agglomerated into one cluster. Once agglomerated, the center of the cluster is recomputed. The process stops after n−m iterations when there are m clusters left.

While the K-means and the hierarchical agglomeration algorithms generate in-partitions of the vector set such that the vectors within one partition are close to each other in the CritMat problem, a search for a set of vectors that are close to the original vector set and are able to dominate all vectors in the set by linear combination is made. One direct approach is to utilize the result from the clustering algorithm by generating one "head" vector from each of the clusters such that the head vector dominates the vectors within the cluster. This can be easily achieved by setting the value of the head vector to the maximum value of all cluster members in each dimension, i.e., head $(\{\vec{x}_i\}) = (\max_i x_{i,1}, \max_i x_{i,2}, \ldots)$ where $\vec{x}_i = (x_{i,1}, x_{i,2}, \ldots)$. Since the cluster members are close to each other, the head vector should also be close to the cluster members, satisfying the requirement for CritMat.

A potential problem with the K-means Head and Hierarchical Head clustering-based algorithms is that clustering treats each vector in the original data set equally while CritMat gives more importance to the vectors with high volume. To correct this effect, a Critical-ness Aware Clustering (CritAC) algorithm is disclosed by adapting the hierarchical agglomeration method. The key idea is to define a dominating cluster head, as opposed to a cluster center, and explicitly consider the oversizing cost function in every agglomeration step. CritAC starts with n clusters headed by each of the original n vectors. At each iteration, the pair of clusters with the minimum "merging cost" is agglomerated and the vector that has value in every dimension equal to that of the maximum among vectors from both clusters becomes the new cluster head. This repeats after n−m iterations when there are m clusters left. In one embodiment, the CritAC algorithm may be represented by the following pseudocode:

Initialization:
    for each $x_i$
        create cluster $C_i = \{x_i\}$
        define cluster head $h_i = x_i$
        let $m_i$ = volume of $x_i$
    for each $C_i$, $C_j$
        compute cost(i,j):=
            volume(head($h_i,h_j$))-max($m_i,m_j$)
    sort cost(i,j) in ascending order
for step=1 to n−m
    merge the clusters $C_i,C_j$ with min cost(i,j):
    $h_i$=head($h_i,h_j$)
    $m_i$=max($m_i,m_j$)
    remove cluster $C_h$
    for each remaining cluster $C_k$
        cost(i,k)=cost(k,i)=
            volume(head($h_i,h_k$))-max($m_i,m_k$)
        insert cost(i,k) in sorted list
return $\{h_i\}$ remaining clusters In this algorithm, $x_i$ represents a traffic matrix, C, represents a cluster containing traffic matrix $x_i,h_i$ represents the cluster head of the traffic matrix $x_i,m_i$ represent the maximum volume in the cluster $C_i$, $C_j$ represents a second cluster that is being paired with the first cluster $C_i$, where n represents the total number of input traffic matrices, and m represents the total number of critical traffic matrices desired.

Figure 3:
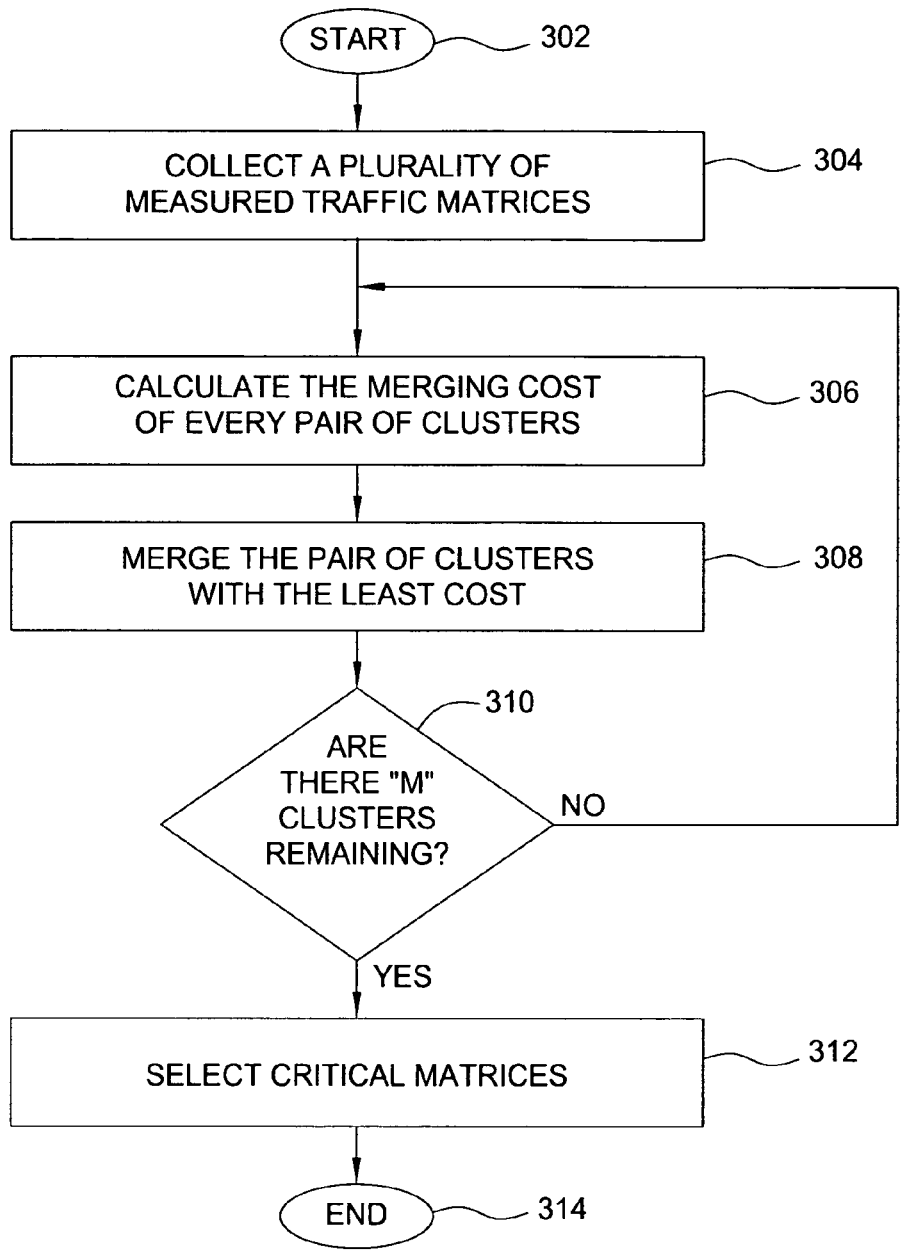
FIG. 3 a method for finding a critical traffic matrix in accordance with the present invention.

FIG. 3 illustrates a method 300 for determining at least one critical traffic matrix in accordance with the present invention and represents one embodiment of the above pseudocode. Method 300 begins at step 302 and proceeds to step 304 where a plurality of measure traffic matrices are collected. In one embodiment, the traffic matrices are collected over an extended period of time (e.g., several months) and stored in a central location. In the event critical traffic matrices are required, the plurality of traffic matrices is separated into clusters. Notably, each cluster initially contains one traffic matrix.

At step 306, the merging cost of every pair of clusters is calculated. In one embodiment, the cost of merging a pair of clusters is calculated for each cluster. Specifically, a merging cost is calculated for a given cluster with every other single cluster. This process is then repeated for the next cluster (and so forth) until a pairwise merging cost calculation is made for each cluster when paired up with every other cluster.

At step 308, the pair of clusters with the least merging cost is agglomerated. In one embodiment, the pair of clusters characterized by the least merging cost is combined into a new, single cluster. In one embodiment, the new cluster comprises a merged vector that has a value in every dimension that is equal to the maximum value from the vectors associated with the combined clusters. The merged vector then becomes the new cluster head. In one embodiment, the original traffic matrices are also maintained in the newly merged cluster. In another embodiment, the two original traffic matrices may be discarded.

At step 310, a determination of whether a predefined number of clusters remain is made. In one embodiment, a predefined number of integer "m" clusters is designated as the number of clusters that should remain after the method 300 is completed (i.e., if m=10, then method 300 ends after 10 clusters remain). This integer may be designated by the user or network operator. If there are more than in clusters remaining, then the method 300 loops back to step 306 and recalculates the merging cost of every pair of clusters. Furthermore, the new cluster is also included in the calculations. Conversely, if the number of clusters remaining equal to m after step 308 concludes, then the method 300 proceeds to step 312 where the cluster heads of the remaining clusters are selected as the critical traffic matrices. The method 300 then ends at step 314.

The runtime of CritAC can be evaluated as follows. The most expensive computation in initialization is to calculate cost(i, j) for all $n(n-1)/2$ pairs of clusters. Each pair requires $O(K)$ computations (to obtain head($C_i$, $C_j$)) where K is the number of dimensions. Thus the runtime for line 6 to line 8 is $O(n^2K)$. In line 9, sorting $n(n-1)/2$ cost values requires $O(n^2 \log(n))$ computation (using B-Tree). Thus the overall runtime for initialization is $O(n^2K+n^2 \log(n))$. For agglomeration steps, each iteration requires $O(nK+n \log(n))$ computation for calculating cost(i, k) and inserting the result into sorted list (line 16 to 19). There are n−m iterations. Thus the overall runtime for agglomeration steps is $O(n(n-m)K+n(n-m) \log(n))$ and the total runtime of CritAC is dominated by that of the initialization steps—$O(n^2K+n^2 \log(n))$.

It should be noted that it is possible to use other forms of the cost function in CritAC. For example, a weight can be associated to each dimension in the traffic matrices that captures the distance between the corresponding flow's origin and destination.

Figure 4:
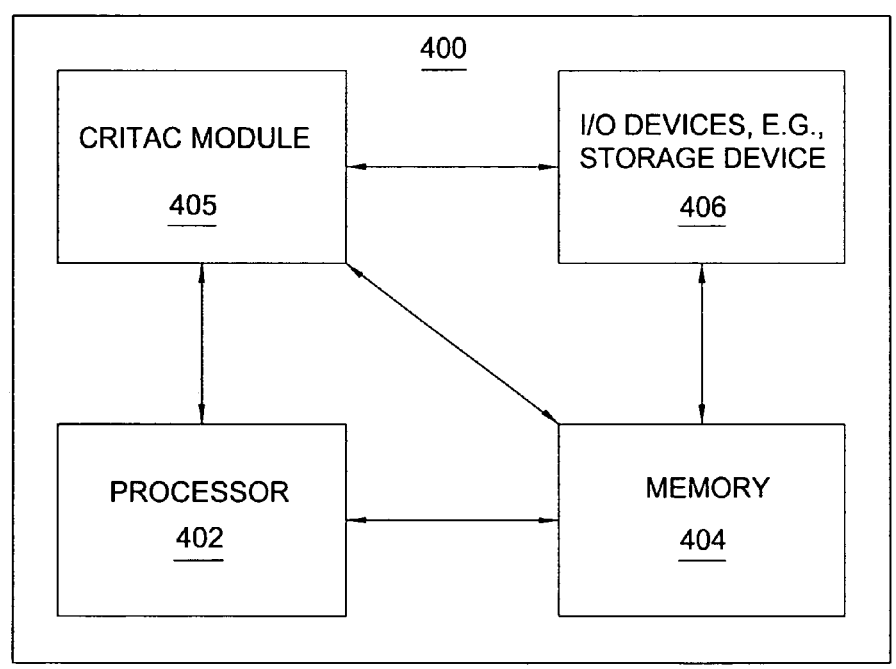
FIG. 4 is a block diagram depicting an exemplary embodiment of a computer suitable for implementing the processes and methods described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM) and/or persistent memory (Flash), a CritAC module 405, and various input/output devices 406 (e.g., storage devices, including but not limited to, a tape drive, a floppy drive, a hard disk drive, a compact disk drive, a receiver, a transmitter, a speaker, a display, a speech synthesizer, an output port, and a user input device (such as a keyboard, a keypad, a mouse, etc.) and the like.

It should be noted that the present invention can be implemented in software and/or in a combination of software and hardware, e.g., using application specific integrated circuits (ASIC), a general purpose computer or any other hardware equivalents. In one embodiment, the CritAC module or process 405 can be loaded into memory 404 and executed by processor 402 to implement the functions as discussed above. As such, the present CritAC module 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for determining a critical traffic matrix from a plurality of traffic matrices for a network, comprising:
    calculating a merging cost for each pair of clusters within a plurality of clusters, where each of the plurality of traffic matrices is organized into one of the plurality of clusters;
    merging a pair of clusters characterized by a smallest merging cost to generate a merged cluster;
    repeating the calculating and the merging until a predefined number of clusters remains, wherein the remaining clusters are used to determine the critical traffic matrix, wherein each of the plurality of traffic matrices is a multi-dimensional array having elements which numerically represent a traffic flow between an origin node and a destination node in the network, wherein the merging merges two multi-dimensional arrays, wherein the critical traffic matrix dominates a set of the plurality of traffic matrices; and
    provisioning the network in accordance with the critical traffic matrix.

2. The method of claim 1, further comprising:
    collecting the plurality of traffic matrices prior to the calculating.

3. The method of claim 1, wherein the merging cost comprises a distance function.

4. The method of claim 3, wherein the distance function comprises a minimum distance to an input traffic matrix.

5. The method of claim 1, wherein the merging comprises:
    generating a head vector for the merged cluster.

6. The method of claim 5, wherein the head vector comprises the critical traffic matrix.

7. The method of claim 1, wherein the critical traffic matrix comprises a head vector that dominates each vector of a set of vectors within the set of the plurality of traffic matrices.

8. The method of claim 1, wherein the plurality of clusters comprises all possible pairs of clusters.

9. An apparatus for determining a critical traffic matrix from a plurality of traffic matrices, comprising:
    a processor; and
    a non-transitory computer readable medium having stored thereon a plurality of instructions, the plurality of instructions including instructions which, when executed by the processor, causes the processor to perform a method, comprising:
    calculating a merging cost for each pair of clusters within a plurality of clusters, where each of the plurality of traffic matrices is organized into one of the plurality of clusters;
    merging a pair of clusters characterized by a smallest merging cost to generate a merged cluster;
    repeating the calculating and the merging until a predefined number of clusters remains, wherein the remaining clusters are used to determine the critical traffic matrix, wherein each of the plurality of traffic matrices is a multi-dimensional array having elements which numerically represent a traffic flow between an origin node and a destination node in the network, wherein the merging merges two multi-dimensional arrays, wherein the critical traffic matrix dominates a set of the plurality of traffic matrices; and
    provision the network in accordance with the critical traffic matrix.

10. A non-transitory computer readable medium having stored thereon a plurality of instructions, the plurality of instructions including instructions which, when executed by a processor, causes the processor to perform a method for determining a critical traffic matrix from a plurality of traffic matrices, comprising:

calculating a merging cost for each pair of clusters within a plurality of clusters, where each of the plurality of traffic matrices is organized into one of the plurality of clusters;

merging a pair of clusters characterized by a smallest merging cost to generate a merged cluster;

repeating the calculating and the merging until a pre-defined number of clusters remains, wherein the remaining clusters are used to determine the critical traffic matrix, wherein each of the plurality of traffic matrices is a multi-dimensional array having elements which numerically represent a traffic flow between an origin node and a destination node in the network, wherein the merging merges two multi-dimensional arrays, wherein the critical traffic matrix dominates a set of the plurality of traffic matrices; and provisioning the network in accordance with the critical traffic matrix.

11. The non-transitory computer readable medium of claim 10, wherein the plurality of clusters comprises all possible pairs of clusters.

12. The non-transitory computer readable medium of claim 10, further comprising:

collecting the plurality of traffic matrices prior to the calculating.

13. The non-transitory computer readable medium of claim 10, wherein the merging cost comprises a distance function.

14. The non-transitory computer readable medium of claim 10, wherein the merging comprises:

generating a head vector for the merged cluster.

15. The non-transitory computer readable medium of claim 14, wherein the head vector comprises the critical traffic matrix.

16. The non-transitory computer readable medium of claim 10, wherein the critical traffic matrix comprises a head vector that dominates each vector of a set of vectors within the set of the plurality of traffic matrices.

* * * * *